US012580843B2

(12) United States Patent
Cros et al.

(10) Patent No.: US 12,580,843 B2
(45) Date of Patent: Mar. 17, 2026

(54) METHOD FOR DETERMINING AN INTERCONNECTION TOPOLOGY BETWEEN SWITCHES OF A COMMUNICATION NETWORK, CORRESPONDING COMPUTER PROGRAM PRODUCT AND CORRESPONDING DEVICE

(71) Applicant: LATELEC, Toulouse (FR)

(72) Inventors: Guillaume Cros, L'Union (FR); Manuel Trollat, Saint-Orens de Gameville (FR)

(73) Assignee: LATELEC, Toulouse (FR)

( * ) Notice: Subject to any disclaimer, the term of this patent is extended or adjusted under 35 U.S.C. 154(b) by 155 days.

(21) Appl. No.: 18/687,889

(22) PCT Filed: Aug. 31, 2022

(86) PCT No.: PCT/EP2022/074231
§ 371 (c)(1),
(2) Date: Feb. 29, 2024

(87) PCT Pub. No.: WO2023/031288
PCT Pub. Date: Mar. 9, 2023

(65) Prior Publication Data
US 2025/0016088 A1      Jan. 9, 2025

(30) Foreign Application Priority Data

Sep. 1, 2021    (FR) ...................................... 2109146

(51) Int. Cl.
H04L 45/125        (2022.01)
H04L 41/12        (2022.01)
(52) U.S. Cl.
CPC ............ H04L 45/125 (2013.01); H04L 41/12 (2013.01)

(58) Field of Classification Search
CPC ... H04L 45/125; H04L 41/12; H04L 43/0894; H04L 45/22
See application file for complete search history.

(56) References Cited

U.S. PATENT DOCUMENTS 10,439,879 B2    10/2019    Dhesikan et al.
2016/0065449 A1*  3/2016    Pani ...................... H04L 45/125
                                                      370/235
(Continued)

FOREIGN PATENT DOCUMENTS

WO        2016069927        5/2016
WO        2018145945        8/2018

OTHER PUBLICATIONS

International Search Report for application No. PCT/EP2022/074231 dated Dec. 7, 2022.

*Primary Examiner* — Tonia L Dollinger
*Assistant Examiner* — Joseph M Cousins
(74) *Attorney, Agent, or Firm* — Perman & Green, LLP

(57)        ABSTRACT

A method for determining an interconnection topology between switches of a communication network. Such a method includes, for at least one given leaf switch, determining an effective path for the communication of data between the leaf switch and a root switch, determining the effective path including: determining at least one candidate path between the leaf switch and the root switch, the candidate path including at least one section between a first switch and a second switch; and for each candidate path, computing a metric based on at least one quantity representative of a ratio, determined for a corresponding section of the candidate path, between an effective requirement for the data throughput transiting via the section and a transport capacity of the connection of the section. The effective path (Continued)

is determined as being the candidate path with the extremal metric from the one or more candidate paths.

14 Claims, 2 Drawing Sheets

(56) References Cited

U.S. PATENT DOCUMENTS

| 2016/0088521 | A1* | 3/2016 | Ho | ........................ | H04W 40/12 |
| | | | | | 455/453 |
| 2023/0062080 | A1* | 3/2023 | Sidebottom | ............. | H04L 45/02 |

* cited by examiner

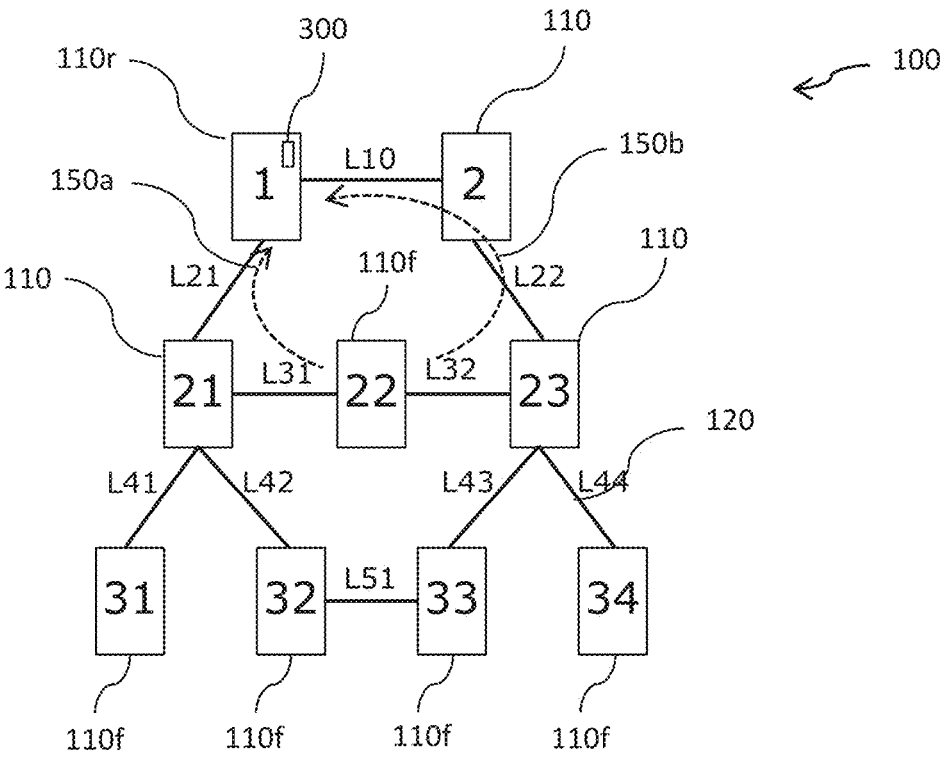
[Fig.1]
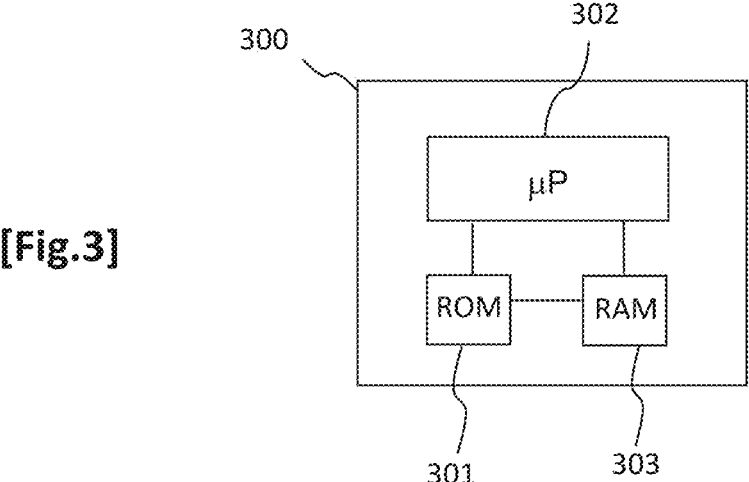
[Fig.3]

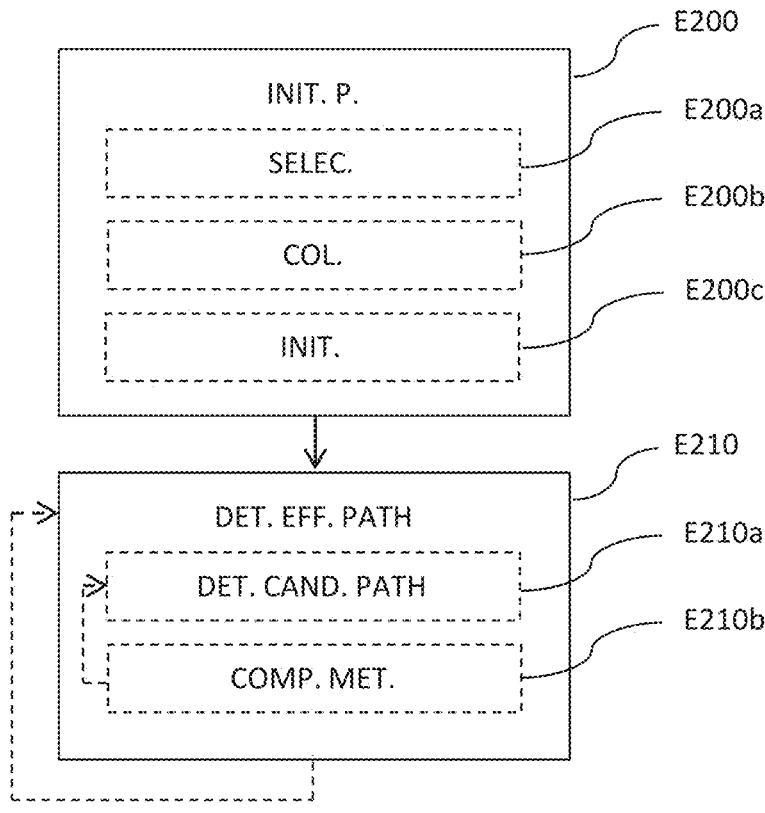
[Fig.2]

METHOD FOR DETERMINING AN INTERCONNECTION TOPOLOGY BETWEEN SWITCHES OF A COMMUNICATION NETWORK, CORRESPONDING COMPUTER PROGRAM PRODUCT AND CORRESPONDING DEVICE

CROSS REFERENCE TO RELATED APPLICATIONS

This application is a National Stage of International Application No. PCT/EP2022/074231, having an International Filing Date of 31 Aug. 2022, which designated the United States of America, and which International Application was published under PCT Article 21(2) as WO Publication No. 2023/031288 A1, which claims priority from and the benefit of French Patent Application No. 2109146 filed on 1 Sep. 2021, the disclosures of which are incorporated herein by reference in their entireties.

BACKGROUND

Field

The field of the disclosure is that of communication networks.

The disclosure relates more particularly to a method for determining the interconnection topology between switches of such a communication network.

The disclosure thus has numerous uses, in particular, but not exclusively, in all the fields in which such communication networks are used. This is for example the computer or telecommunications field.

Brief Description of Related Developments

In the rest of this document it is endeavored more particularly to describe an existing issue in the field of communication networks of the Ethernet type with which the inventors of the present patent application have been confronted. The disclosure is of course not limited to this specific field of use, but has an interest for the determination of the interconnection topology between switches of any type of communication network.

The topology of the networks of the Ethernet type is dynamic in the sense that it can be modified during operation of the network. More particularly, the interconnection topology is determined upon initialization of the network but it is also updated in case of failure of a switch or of a link. The topology is determined or updated via the implementation of an "STP" (for Spanning Tree Protocol) algorithm. The STP protocol is a network protocol of level 2 allowing to determine a topology for such a network. The STP protocol is defined by the standard IEEE 802.1D. The STP algorithm defines a single path between two points of the network by administratively blocking certain ports of the switches. For example, the STP algorithm determines for each switch of the network, on the one hand, the root ports (i.e. the ports of each switch that have the shortest "distance" to the switch selected as root switch) and, on the other hand, the designated ports (i.e. the ports of each switch connected to the connection that leads most directly to the root switch). The ports that are neither root nor designated are blocked.

However, according to such an algorithm, the interconnection topology of the network only depends on the "distance" from a given switch to the root switch. This results in topologies that can be sub-optimal from the point of view of the effective use, in particular with regard to the data throughput, that will be made of the network. For example, certain interconnections will end up overloaded while other interconnections will end up underutilized.

There is therefore a need for a technique allowing to determine the interconnection topology in a communication network in an improved manner given the effective use that will be made thereof.

SUMMARY

In one aspect of the disclosure, a method is proposed for determining an interconnection topology between switches of a communication network comprising a plurality of switches, including at least a leaf switch and a root switch, as well as a set of connections for the communication of data between the switches. Such a method comprises, for at least one given leaf switch, a determination of an effective path for the communication of data between the given leaf switch and the root switch. The determination of the effective path comprises:

- a determination of at least one candidate path for the communication of data between the given leaf switch and the root switch, the candidate path comprising at least one section comprising a connection between a first switch and a second switch; and
- for each candidate path, a computing of a metric based on at least one quantity representative of a ratio, determined for a corresponding section of the candidate path, between an effective requirement for the data throughput transiting via the section and a transport capacity of the connection of the section.

The effective path for the communication of data between the given leaf switch and the root switch is determined as being the candidate path with the extremal metric out of said at least one candidate path.

The effective requirement for the data throughput transiting via the section is expressed as a weighted sum between, on the one hand, an already-known requirement for the data throughput transiting via the first switch of the section and, on the other hand, a specific requirement for the data throughput associated with the given leaf switch.

Thus, the disclosure proposes a novel and inventive solution for determining the interconnection topology in a communication network.

More particularly, since the metric is based on the ratio between the effective requirement for the data throughput with respect to the capacity of the corresponding connection of sections, the candidate path with the extremal metric corresponds to the candidate path for which the effective data throughput impacts its own capacity the least at the moment of determination of the effective path in question. For example, the effective path is determined as being the candidate path having the minimal metric when the effective requirement for the data throughput transiting via each section considered is interpreted as the numerator of the corresponding ratio, and the transport capacity of the connection of the section as the denominator.

Such an approach allows to obtain an optimized interconnection topology given the data effectively transiting in the network.

Moreover, the weighting allows a prioritization of the requirements of the various equipment, e.g. as decided by the administrator of the network.

According to some aspects, the metric is based on a weighted sum of the quantities representative of the ratios, determined for each section of a plurality of sections of the candidate path, between the requirement for the data throughput transiting via the section and the transport capacity of the connection of the section.

Such a weighting also allows a prioritization of the requirements of the various switching equipment, but also a prioritization of certain sections of the candidate path.

According to some aspects, the first switch is the switch closest to the given leaf switch along the candidate path, the second switch being the closest to the root switch along the candidate path.

According to some aspects, the method comprises, when the effective path for the communication of data between the given leaf switch and the root switch is determined, an updating of the requirement for the data throughput transiting via each switch along the effective path by increasing it by the specific requirement for the data throughput associated with the given leaf switch. The updated requirement for the data throughput is used during a later implementation of the step of determining an effective path applied to the determination of an effective path for the communication of the data between another given leaf switch and the root switch, for example when the step of determining an effective path is implemented iteratively for each leaf switch of a plurality of leaf switches.

Thus, the data throughput transiting via a switch of the network changes as the interconnection topology is built so as to correctly reflect the effective throughput transiting via the switch in question given the determined topology.

According to some aspects, the step of determining an effective path is implemented iteratively for each leaf switch of a plurality of leaf switches. A current iteration is applied to a leaf switch having the maximal requirement for the data throughput among the leaf switch(es) of the plurality not yet having been the object of an iteration.

Thus, the data paths corresponding to the greatest requirements for the throughput are determined with priority. The data paths in question are thus determined while fully benefiting from the transport capacities of the connections of the network.

According to some aspects, the switches are further each associated with a different identifier belonging to an ordered set of identifiers. When at least two leaf switches of the plurality have the same maximal requirement for the data throughput among the leaf switch(es) of the plurality not yet having been the object of an iteration, the current iteration is applied to the switch associated with the smallest identifier among the at least two leaf switches.

According to some aspects, the method comprises a previous phase of initializing the specific requirement for the data throughput associated with said at least one leaf switch and the requirement for the data throughput transiting via the switches of the plurality of switches.

According to some aspects, the previous initialization phase comprises a collection of the requirement for the data throughput of said at least one leaf switch.

For example, such a collection is carried out by the electronic device implementing the method via the sending of requests to the leaf switches of the network and by collecting the corresponding responses. The requirement for the data throughput of a given leaf switch corresponds to the requirements of the terminal equipment accessing the network via the given leaf switch in question.

According to some aspects, the previous initialization phase comprises an initialization of the requirement for the data throughput transiting via the switches of the plurality of switches to a default value.

According to some aspects, the previous initialization phase further comprises a selection of the root switch among the switches of the plurality of switches.

According to some aspects, the electronic device is implemented in the root switch.

The disclosure also relates to a computer program comprising program code instructions for the implementation of a method as described above, according to any one its various aspects, when it is executed on a computer.

The disclosure also relates to an electronic device for determining an interconnection topology between switches of a communication network comprising a plurality of switches, including at least a leaf switch and a root switch, as well as a set of connections for the communication of data between the switches. Such an estimation device comprises a reprogrammable computing machine or a dedicated computing machine configured to implement the steps of the determination method as described above (according to any one of the various aforementioned aspects). Thus, the features and advantages of this device are the same as those of the corresponding steps of the determination method described above. Consequently, they are not described in more detail.

The disclosure also relates to a switch of a communication network comprising an electronic determination device as described above (according to any one of the various aforementioned aspects).

BRIEF DESCRIPTION OF THE FIGURES

Other goals, features and advantages of the disclosure will be clearer upon reading the following description, given as a simple illustrative, and non-limiting, example in relation to the drawings, among which:

FIG. 1 shows a communication network comprising a plurality of switches according to an aspect of the disclosure;

FIG. 2 shows the steps of a method for determining an interconnection topology between the switches of the network of [FIG. 1] according to an aspect of the disclosure; and FIG. 3 shows an example of a device structure allowing the implementation of the steps of the estimation method of [FIG. 2] according to an aspect of the disclosure.

DETAILED DESCRIPTION

The general principle of the disclosure is based on the estimation, for the determination of an effective path for the communication of data between a given leaf switch and a root switch of a communication network, of a metric associated with each candidate path between the switches in question. According to the technique proposed, such a metric is based on the ratios between the effective requirements for the data throughput transiting via the candidate path and the transport capacities of the connections of the candidate path. The effective path is determined as being the candidate path with the extremal metric, i.e. for which the effective data throughput to be carried impacts its capacity to transport such data the least.

Such an approach allows to obtain an optimized interconnection topology given the data effectively transiting in the network, i.e. given the effective use that will be made of the network.

Now, in relation to [FIG. 1], a communication network 100 comprising a plurality of switches 110, 110*r*, 110*f* (e.g.

a gateway, a router or an equivalent piece of equipment) according to an aspect of the disclosure will be presented.

More particularly, the plurality of switches 110, 110*r*, 110*f* comprises several leaf switches 110*f*. However, in other aspects, the network comprises a single leaf switch 110*f*.

Returning to [FIG. 1], a leaf switch 110*f* is a switch to which one (or more) pieces of user equipment are connected. Such a piece of user equipment (for example a computer, a smartphone, a tablet or an equivalent piece of equipment) accesses, via the leaf switch 110*f* in question, a service e.g. hosted by a remote server also connected to the network 100. For example, the remote server is connected to the network 100 via the root switch 110*r*. The root switch 110*r* is for example a switch of the gateway type connected to the internet. The root switch 110*r* is for example selected as such by the network administrator as described below in relation to [FIG. 2].

Returning to [FIG. 1], the switches 110, 110*r*, 110*f* are each associated here with a different identifier. According to the present aspect, the identifiers are integers. More particularly, the switches of a first rank (e.g. the switches closest to the network core) are associated with the identifiers 1 and 2. The switches of a second rank (e.g. the switches directly connected to the switches of the first rank) are associated with the identifiers 21, 22 and 23. The switches of a third rank (e.g. the switches directly connected to the switches of the second rank) are associated with the identifiers 31, 32, 33 and 34. Such identifiers allow to define an order relationship and thus to separate the switches 110, 110*r*, 110*f* in case of equivalent bandwidth requirements as described below in relation to [FIG. 2].

In other aspects, the identifiers of the switches 110, 110*r*, 110*f* belong more generally to an ordered set of identifiers (e.g. letters of the alphabet) so that an order relationship can be defined.

In other aspects, the switches 110, 110*r*, 110*f* are not each associated with such a different identifier. In this case, the switches 110, 110*r*, 110*f* cannot be separated on the basis of such an identifier.

Returning to [FIG. 1], the network 100 comprises a set of connections 120 for the communication of data between the switches 110, 110*r*, 110*f*, each connection 120 having a determined transport capacity. For reasons of clarity, the various connections 120 are identified here by a corresponding identifier: L10, L21, L22, L31, L32, L41, L42, L43, L44, L51. As a non-limiting illustrative example, [Tab. 1] below gives the transport capacity (in a normalized unit representative of a quantity of data per unit of time) associated with each of the connections 120 of the network 100. Such values will be used as an example to illustrate 10 the implementation of certain steps of the determination method described below in relation to [FIG. 2].

TABLE 1

| Connections 120 (identifier) | Transport capacity (normalized) |
|---|---|
| L10 | 10 |
| L21 | 25 |
| L22 | 25 |
| L31 | 10 |
| L32 | 10 |
| L41 | 25 |
| L42 | 25 |
| L43 | 25 |
| L44 | 25 |
| L51 | 10 |

Returning to [FIG. 1], on the basis of the existing connections 120 in the network 100, several candidate paths are possible most of the time for the communication of data between a given leaf switch 110*f* and the root switch 110*r*. For example, two candidate paths 150*a*, 150*b* exist between the leaf switch 110*f* having the identifier 22 and the root switch 110*r*. More particularly, the first candidate path 150*a* passes via the switch 110 having the identifier 21 and the second candidate path 150*b* passes via the switches 110 having the identifiers 23 and 2.

The determination method described below in relation to [FIG. 2] thus allows to determine the effective path to be used among the two candidate paths 150*a*, 150*b*. Such a method is implemented by the device 300 described in more detail below in relation to [FIG. 3]. The device 300 is implemented here in the root switch 110*r*. In other aspects, the device 300 is implemented in another switch 110, 110*f* of the network 110. In other aspects, the device 300 is implemented in a remote piece of equipment connected to a switch 110, 110*r*, 110*f* of the network 100.

Now, in relation to [FIG. 2], the steps of a method for determining an interconnection topology between switches of the network 100 according to an aspect of the disclosure will be presented.

During a step E200, the device 300 implements an initialization phase comprising, during a step E200*a*, a selection of the root switch 110*r* among the switches 110, 110*r*, 110*f* of the network 100.

Such a selection is carried out for example via a method known per se, e.g. on the basis of the MAC (for Media Access Control) address and a priority number parameterizable by the administrator of the network 100. Alternatively, the network administrator selects the root switch 110*r* as being the switch 110, 110*r*, 110*f* closest to the network core to which the network 100 is connected. This allows for the root switch 110*r* to be the switch via which the data exchanged between the leaf switches 110*f* and the network core transits.

In other aspects, the step E200*a* is not implemented, and the root switch 110*r* is predetermined in the network 100.

Returning to [FIG. 2], the initialization phase comprises the initialization of the specific requirement for the data throughput associated with the leaf switches 110*f*. Such a specific requirement for the data throughput associated with a leaf switch 110*f* corresponds for example to the total data throughput that the leaf switch 110*f* in question must provide to the various pieces of user equipment that are connected to it. For example, during a step E200*b*, the device 300 collects the requirements for the data throughput of the leaf switches 110*f*. To do this, the device 300 sends for example a request to the various switches in order to obtain the respective requirements of the various leaf switches 110*f*. In response to the request, the leaf switches 110*f* send a message comprising a piece of information representative of their specific requirement for the data throughput.

In other aspects, the step E200*b* is not implemented, and the specific requirements of the leaf switches 110*f* are estimated, e.g. on the basis of the average uses previously observed in the network 100.

As a non-limiting illustrative example, [Tab. 2] below gives an example of specific requirements (in the same normalized unit as the data of [Tab. 1] above) of the leaf switches 110*f* of the network 100. Such values will be used as an example to illustrate the implementation of certain steps of the determination method described below.

TABLE 2

| Leaf switch 110f (identifier) | Specific requirement for the data throughput (normalized) |
|---|---|
| 22 | 5 |
| 31 | 7 |
| 32 | 12 |
| 33 | 10 |
| 34 | 40 |

Returning to [FIG. 2], the initialization phase further comprises the initialization of the requirement for the data throughput transiting via the switches 110, 110r, 110f of the plurality of switches. For example, during a step E200c, the device 300 initializes the requirement for the data throughput transiting via the switches 110, 110f, 110r of the plurality switches to a default value. Such a default value is used for the implementation of the step E210 of determining the effective paths described below.

For example, the default value is assigned by the administrator of the network 100. Such a default value corresponds e.g. to a minimum requirement for the data throughput in the network 100 in the absence of a taking into account of the additional requirements related to the specific requirements of the leaf switches 100f. For example, if no data throughput is envisaged in the network 100 in the absence of the data necessary to supply the leaf switches 110f, the device 300 initializes the requirement for the data throughput transiting via the switches 110, 110f, 110r of the plurality of switches to a null value.

In other aspects, all or a part of step E200 is not implemented. Indeed, as described in detail below, step E210 can be implemented iteratively. Step E210 can also be implemented when the topology has been previously established, but a failure of a connection 120 forces the method to be implemented once again. In this case, values previously obtained for the requirement for the data throughput transiting via the switches 110, 110f, 110r of the network 100 or for the requirements for the data throughput of the leaf switches 110f can be used. The same applies to the selection of the root switch 110r. Step E200 can thus not be implemented.

Returning to [FIG. 2], during a step E210, the device 300 implements, for at least one given leaf switch 100f, a determination of an effective path for the communication of data between the given leaf switch 100f and the root switch 100r.

More particularly, the determination of the effective path comprises a step E210a of determining at least one candidate path for the communication of data between the given leaf switch 100f and the root switch 110r. Such a candidate path comprises at least one section comprising a connection 120 between a first switch and a second switch.

As a non-limiting illustrative example, here the implementation of step E210 applied to the leaf switch 100f having the identifier 22 is considered. As indicated above in relation to [FIG. 1], two candidate paths 150a, 150b exist between the leaf switch 110f having the identifier 22 and the root switch 110r. The first candidate path 150a passes via the switch 110 having the identifier 21 and the second candidate path 150b passes via the switches 110 having the identifier 23 and 2.

Moreover, the path 150a comprises:
a first section between the leaf switch 100f having the identifier 22 and the switch 110 having the identifier 21; and a second section between the switch 110 having the identifier 21 and the root switch 110r.

The path 150b comprises:
a first section between the leaf switch 100f having the identifier 22 and the switch 110 having the identifier 23;
a second section between the switch 110 having the identifier 23 and the switch 110 having the identifier 2; and
a third section between the switch 110 having the identifier 2 and the root switch 110r.

Therefore, during the implementation of step E210a, the two candidate paths 150a, 150b are thus determined.

Returning to [FIG. 2], for each candidate path, during a step E210b a metric associated with the candidate path considered is computed. Such a metric is based on at least one quantity representative of a ratio, determined for a corresponding section of the candidate path considered, between an effective requirement for the data throughput transiting via the section in question and a transport capacity of the connection of the section in question.

Here, quantity representative of a ratio means that the metric is based on any quantity that can be expressed in fine on the basis of the ratio initially described above. For example, the inverse ratio, i.e. the ratio between the transport capacity of the connection of the section considered and the effective requirement for the data throughput transiting via the section considered, can be expressed as the inverse of the ratio initially described. The metric can thus be computed in practice from the inverse ratio, this quantity remaining representative of the ratio initially described. The same applies when the metric is computed from a difference between the quantities in question, e.g. when the quantities are expressed in logarithmic units. In this case also, the metric can be computed in practice from such a difference, this quantity remaining representative of the ratio initially described.

Returning to [FIG. 2], the effective requirement for the data throughput transiting via a given section is expressed as a weighted sum between, on the one hand, an already-known requirement for the data throughput transiting via the first switch of the section and, on the other hand, a specific requirement for the data throughput associated with the given leaf switch 110f from which the candidate path considered starts.

For example, the already-known requirement for the data throughput transiting via the first switch of the section corresponds to the initialized value described above in relation to step E210, e.g. during a first implementation of step E210. Alternatively, the already-known requirement for the data throughput transiting via the first switch of the section can correspond to a value determined, if necessary, during a previous iteration of step E210 as described below in the context of an iterative implementation of step E210 for various leaf switches 110f of the network 100.

Moreover, the specific requirement for the data throughput associated with the given leaf switch 110f corresponds to the requirement as described above in relation to step E200b.

In the present aspect, the sum is weighted between, on the one hand, the already-known requirement for the data throughput transiting via the first switch of the section and, on the other hand, the specific requirement for the data throughput associated with the given leaf switch. Such a weighting allows a prioritization of the requirements of the various switches, e.g. as decided by the administrator of the network. In other aspects, no weighting is applied, which is equivalent to applying a unit weighting coefficient to each term of the sum.

In some aspects, the metric associated with a given candidate path is based on a weighted sum of the quantities representative of the ratios as defined above and determined for each section of a plurality of sections of the candidate path considered. Such a weighting also allows a prioritization of the requirements of the various switches 110, 110r, 110f of the network 100, but also a prioritization of certain sections of the candidate path considered. However, in some aspects, no weighting is applied, which is equivalent to applying a unit weighting coefficient to each term of the sum.

For example, weightings as described above allow a balancing of the data streams between the various possible data paths in the network. Indeed, in the absence of weighting during the determination of the interconnection topology, a particular data path risks ending up loaded, possibly to its maximum capacity, while other possible data paths end up underused. For example, let us consider two switches connected to each other both by a first path having a capacity of 10 Gbit/s and by a second path having a capacity of 1 Gbit/s. The absence of weighting during the determination of the interconnection topology can lead to making the entire data stream pass between the two switches in question via the data path having the largest capacity, i.e. the first path in the present case. In other words, all the effective paths of the network passing via the two switches in question will comprise the first path in question. On the contrary, the use of a weighting allows to obtain an interconnection topology in which the first path and the second path are used in a balanced manner. In particular, such a balancing allows to maximize the residual capacity of each data path. This allows for example to obtain an interconnection topology more resilient against a throughput peak associated with a user. Such weightings thus allow to improve the user experience.

In some aspects, the metric is based on the ratios determined for all of the sections that form the candidate path considered. In other aspects, only the ratios determined for certain sections of the path in question are taken into account. For example, when the leaf switch 110f considered is connected by a single connection 120 to the rest of the network 100, all the candidate paths comprise the corresponding section. Therefore, it is not necessary to take into account this section since this would simply lead to the same additional term in the various metrics associated with each candidate path. The computing load associated with the method is thus reduced.

In some aspects, a section is defined so that the first switch of the section is the switch closest to the leaf switch 110f along the candidate path, the second switch being the closest to the root switch 110r along the candidate path. In other aspects, the first switch of the section is the switch closest to the root switch 110r along the candidate path, the second switch being the closest to the leaf switch 110f along the candidate path.

Returning to [FIG. 2], once the metric has been computed for each candidate path considered, the effective path is determined as being the candidate path with the extremal metric out of the various metrics associated with the various candidate paths. For example, the effective path is determined as being the candidate path having the minimal metric when the quantities on which the metric is based are directly the ratios between the effective requirement for the data throughput transiting via each section considered and the transport capacity of the connection of the section considered (and not the inverse ratios or other as discussed above in relation to step E210b). The effective path thus corresponds to the candidate path for which the effective data throughput to be carried impacts its own capacity the least at the moment of the determination of the effective path in question.

Such an approach allows to obtain an optimized interconnection topology given the data effectively transiting in the network.

To illustrate step E210, the implementation of step E210 applied to the leaf switch 100f having the identifier 22 is now considered. To do this, it is considered here that the implementation in question corresponds to a first implementation of step E210 after the initialization phase described above. Therefore, it is supposed that the requirement for the data throughput transiting via the switches 110, 110f, 110r of the plurality of switches is equal to the default value initialized during the implementation of step E200c. Moreover, it is considered for more simplicity that the default value in question is null. Therefore, the effective requirement for the data throughput transiting via each section of the path 150a boils down to a specific requirement for the data throughput associated with the leaf switch 100f having the identifier 22, i.e. the normalized value 5 if reference is made to [Tab. 2] above.

Moreover, it is considered that the transport capacities of the connections having the identifiers L31 and L21 are given in [Tab. 1] above. Therefore, considering that the metric implemented corresponds directly to the ratio between the effective requirement for the data throughput transiting via the section considered and the transport capacity of the connection of the section considered, the following ratios are obtained for the sections of the path 150a:

first section between the leaf switch 100f having the identifier 22 and the switch 110 having the identifier 21: $5/10$;

second section between the switch 110 having the identifier 21 and the root switch 110r: $5/25$.

Considering for simplicity that there is no weighting between the various sections of the path 150a, a metric for the complete path 150a equal to $5/10+5/25=7/10$ is obtained.

Under the same hypotheses, the following ratios are obtained for the sections of the path 150b:

first section between the leaf switch 100f having the identifier 22 and the switch 110 having the identifier 23: $5/10$;

second section between the switch 110 having the identifier 23 and the switch 110 having the identifier 2: $5/25$; and third section between the switch 110 having the identifier 2 and the root switch 110r: $5/10$.

Considering here again for simplicity that there is no weighting between the various sections of the path 150b, a metric for the complete path 150b equal to $5/10+5/25+5/10=12/10$ is obtained.

Therefore, the effective path for the communication of data between the leaf switch 110f and the root switch 110r is determined as being the candidate path having the lowest metric, i.e. the path 150a. The path 150a is effectively the candidate path for which the data throughput to be carried to supply the leaf switch 110f having the identifier 22 has the least impact given its capacity at the moment of the determination of the effective path.

Returning to [FIG. 2], once the effective path has been determined for a given leaf switch 100f, an update of the requirement for the data throughput transiting via each switch along the effective path in question is carried out. More particularly, the requirement for the data throughput in question is increased by the specific requirement for the data throughput associated with the given leaf switch 100f. Such an update allows for example a later implementation of the method, in particular step E210, applied to the determination of an effective path for the communication of data between another leaf switch 110f and the root switch 110r.

Thus, the data throughput transiting via a switch 110, 110f, 110r of the network 100 changes as the interconnection topology is built so as to correctly reflect the effective throughput transiting via the switch 110, 110f, 110r in question given the topology already determined.

In some aspects, step E210 is implemented iteratively for each leaf switch 110f of a plurality of leaf switches 110f.

In other aspects, step E210 is not implemented again, e.g. when an effective path has been determined for all the leaf switches 110f. In this case, the update of the requirement for the data throughput transiting via each switch along the effective path that has just been determined is not necessarily carried out.

In some aspects, step E210 is implemented iteratively for each leaf switch 110f of a plurality of leaf switches 110f. A current iteration is applied to a leaf switch 110f having a maximal requirement for the data throughput out of the leaf switch(es) 110f of the plurality not yet having been the object of an iteration.

Thus, the data paths corresponding to the greatest requirements for the throughput are determined with priority. The data paths in question are thus determined while fully benefiting from the transport capacities of the connections of the network.

In some aspects in which the switches 110, 110f, 110r are further each associated with a different identifier belonging to an ordered set of identifiers (here integers), when at least two leaf switches 110f of the network 100 have the same maximal requirement for the data throughput among the leaf switches 110f not yet having been the object of an iteration, the current iteration of step E210 is applied to the switch associated with the smallest identifier, in the sense of the order relationship of the ordered set, out of the at least two leaf switches.

In other aspects, the switches are not each associated with such an identifier. In this case, the switches cannot be separated on the basis of such an identifier during the implementation of step E210.

In other aspects, step E210 is not implemented iteratively. For example, when the topology of the network 100 has already been set, the method can be implemented for a single iteration, e.g. after a failure on a link of a data path serving a given leaf switch 110f.

Once the interconnection topology of the network 100 has been determined by implementing the method of [FIG. 2], the device 300 can also configure the network 100 according to the configuration thus determined. For example, the device 300 sends messages to the various switches 110, 110f, 110r in order to block the unused ports in the configuration in question. Alternatively, the device 300 provides the topology determined by implementing the method of [FIG. 2] to a third-party device for the third-party device to itself implement the topology be configuring the various switches 110, 110f, 110r of the network 100.

Now, in relation to [FIG. 3], an example of a structure of the device 300 allowing to implement certain steps of the determination method of [FIG. 2] according to an aspect of the disclosure will be presented.

The device 300 comprises a random-access memory 303 (for example a RAM memory), a processing unit 302 equipped for example with a processor, and controlled by a computer program stored in a read-only memory 301 (for example a ROM memory or a hard disk). Upon initialization, the code instructions of the computer program are for example loaded into the random-access memory 303 before being executed by the processor of the processing unit 302.

This [FIG. 3] illustrates only a particular manner, among several possible, of carrying out the device 300 in order for it to carry out certain steps of the determination method according to the disclosure (according to any one of the aspects and/or alternatives described above in relation to [FIG. 2]). Indeed, these steps can be carried out indifferently on a reprogrammable computing machine (a PC computer, a DSP processor or a microcontroller) executing a program comprising a sequence of instructions, or on a dedicated computing machine (for example a set of logic gates like an FPGA or an ASIC, or any other hardware module).

In the case in which the device 300 is carried out with a reprogrammable computing machine, the corresponding program (that is to say the sequence of instructions) can be stored in a storage medium removable (for example such as a CD-ROM, a DVD-ROM, a USB key) or not, this storage medium being partly or totally readable by a computer or a processor.

In some aspects, the device 300 is included in a switch 110 of the network 100.

In some aspects, the device 300 is included in the root switch 110r.

In some aspects, the device 300 is included in a leaf switch 110f.

What is claimed is:

1. A method for determining an interconnection topology between switches of a communication network comprising a plurality of switches, including at least a leaf switch and a root switch, as well as a set of connections for the communication of data between the switches, characterized in that an electronic device carries out, for at least one given leaf switch, a determination of an effective path for the communication of data between said given leaf switch and the root switch, the determination of the effective path comprising:

a determination of at least one candidate path for the communication of data between the given leaf switch and the root switch, the candidate path comprising at least one section comprising a connection between a first switch and a second switch; and for each candidate path, a computing of a metric based on at least one quantity representative of a ratio, determined for a corresponding section of the candidate path, between an effective requirement for the data throughput transiting via the section and a transport capacity of the connection of the section, said effective path for the communication of data between said given leaf switch and the root switch being determined as being the candidate path with the extremal metric out of said at least one candidate path, wherein said effective requirement for the data throughput transiting via the section is expressed as a weighted sum between, on the one hand, an already-known requirement for the data throughput transiting via the first switch of said section and, on the other hand, a specific requirement for the data throughput associated with the given leaf switch.

2. The method according to claim 1, wherein said metric is based on a weighted sum of the quantities representative of the ratios, determined for each section of a plurality of sections of the candidate path, between the requirement for the data throughput transiting via the section and the transport capacity of the connection of the section.

3. The method according to claim 1, wherein said first switch is the switch closest to said given leaf switch along said candidate path, said second switch being the closest to said root switch along said candidate path.

4. The method according to claim 1, comprising, when said effective path for the communication of data between said given leaf switch and the root switch is determined, an updating of the requirement for the data throughput transiting via each switch along said effective path by increasing it by the specific requirement for the data throughput associated with the given leaf switch, said update allowing a later update of said determination of an effective path applied to the determination of an effective path for the communication of the data between another given leaf switch and the root switch.

5. The method according to claim 4, said determination of an effective path being implemented iteratively for each leaf switch of a plurality of leaf switches, a current iteration being applied to a leaf switch having the maximal requirement for the data throughput out of leaf switches of said plurality not yet having been the object of an iteration.

6. The method according to claim 5, wherein the switches are further each associated with at least one different identifier belonging to an ordered set of identifiers, wherein when at least two leaf switches of said plurality have the same maximal requirement for the data throughput among leaf switches of said plurality not yet having been the object of an iteration, the current iteration is applied to the switch associated with the smallest identifier out of the at least two leaf switches.

7. The method according to claim 1, comprising a previous phase of initializing the specific requirement for the data throughput associated with said at least one leaf switch and the requirement for the data throughput transiting via the switches of the plurality of switches.

8. The method according to claim 7, wherein the previous initialization phase comprises a collection of the requirement for the data throughput of said at least one leaf switch.

9. The method according to claim 7, wherein the previous initialization phase comprises an initialization of the requirement for the data throughput transiting via the switches of the plurality of switches to a default value.

10. The method according to claim 7, wherein the previous initialization phase further comprises a selection of said root switch among the switches of the plurality of switches.

11. The method according to claim 7, wherein said electronic device is implemented in said root switch.

12. A computer program product comprising non-transitory computer readable program code instructions for the implementation of the method according to claim 1, when said program is executed on a computer.

13. An electronic device for determining an interconnection topology between switches of a communication network comprising a plurality of switches, including at least a leaf switch and a root switch, as well as a set of connections for the communication of data between the switches, characterized in that it comprises a reprogrammable computing machine or a dedicated computing machine configured to carry out, for at least one given leaf switch, a determination of an effective path for the communication of data between said given leaf switch and the root switch, the determination of the effective path comprising:

a determination of at least one candidate path for the communication of data between the given leaf switch and the root switch, the candidate path comprising at least one section comprising a connection between a first switch and a second switch; and for each candidate path, a computing of a metric based on at least one quantity representative of a ratio, determined for a corresponding section of the candidate path, between an effective requirement for the data throughput transiting via the section and a transport capacity of the connection of the section, said effective path for the communication of data between said given leaf switch and the root switch being determined as being the candidate path with the extremal metric out of said at least one candidate path, wherein said effective requirement for the data throughput transiting via the section is expressed as a weighted sum between, on the one hand, an already-known requirement for the data throughput transiting via the first switch of said section and, on the other hand, a specific requirement for the data throughput associated with the given leaf switch.

14. A switch of a communication network, characterized in that it comprises a device according to claim 13.

* * * * *